United States Patent
Uemura

(10) Patent No.: US 10,387,756 B2
(45) Date of Patent: Aug. 20, 2019

(54) IMAGE FORMING APPARATUS

(71) Applicant: KYOCERA Document Solutions Inc., Osaka-shi, Osaka (JP)

(72) Inventor: Shizuya Uemura, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/933,778

(22) Filed: Mar. 23, 2018

(65) Prior Publication Data
US 2018/0285701 A1    Oct. 4, 2018

(30) Foreign Application Priority Data

Mar. 31, 2017    (JP) .................. 2017-070423

(51) Int. Cl.
| | | |
|---|---|---|
| *G03G 15/08* | (2006.01) | |
| *G06K 15/12* | (2006.01) | |
| *G03G 21/18* | (2006.01) | |
| *G03G 21/16* | (2006.01) | |
| *G06K 15/00* | (2006.01) | |

(52) U.S. Cl.
CPC .......... *G06K 15/12* (2013.01); *G03G 15/0822* (2013.01); *G03G 15/0863* (2013.01); *G03G 21/1657* (2013.01); *G03G 21/1882* (2013.01); *G03G 21/1892* (2013.01); *G06K 15/407* (2013.01); *G03G 2215/0695* (2013.01)

(58) Field of Classification Search
CPC ........... G03G 15/0863; G03G 15/0856; G03G 15/0822; G03G 15/556; G03G 21/1882
See application file for complete search history.

(56) References Cited

U.S. PATENT DOCUMENTS

| | | | |
|---|---|---|---|
| 2005/0196180 A1* | 9/2005 | Harumoto .......... | G03G 15/0863 399/12 |
| 2008/0267666 A1* | 10/2008 | Shirokoshi ............... | B41J 29/02 399/222 |
| 2012/0051758 A1* | 3/2012 | Hayakawa .......... | G03G 15/0863 399/12 |

FOREIGN PATENT DOCUMENTS

JP    2003271021 A    9/2003

* cited by examiner

*Primary Examiner* — Walter L Lindsay, Jr.
*Assistant Examiner* — Jessica L Eley
(74) *Attorney, Agent, or Firm* — Alleman Hall Creasman & Tuttle LLP

(57) ABSTRACT

In an image forming apparatus, a recognition tag is an electronic tag in which recognition information is recorded in advance. A displacement mechanism holds a displacement portion at a first position so as to make a communication access from a tag reader to a recognition tag possible in a case where a replenishment unit is not attached to a unit attachment portion, and holds the displacement portion at a second position so as to make the communication access from the tag reader to the recognition tag impossible in a case where the replenishment unit is attached to the unit attachment portion. The state determining portion determines a state from among a unit attachment state, a unit non-attachment state, and an exceptional state based on information obtained via the tag reader.

5 Claims, 5 Drawing Sheets

IMAGE FORMING APPARATUS

INCORPORATION BY REFERENCE

This application is based upon and claims the benefit of priority from the corresponding Japanese Patent Application No. 2017-070423 filed on Mar. 31, 2017, the entire contents of which are incorporated herein by reference.

BACKGROUND

The present disclosure relates to an image forming apparatus.

In general, an image forming apparatus includes at least one unit attachment portion to which a replenishment unit storing developer can be attached in a detachable manner. An image forming apparatus that can execute a color printing includes four unit attachment portions that respectively correspond to yellow, cyan, magenta, and black developer.

In addition, the image forming apparatus may include a unit detection sensor which is configured to detect whether or not the replenishment unit is attached to the unit attachment portion. When the unit detection sensor detects that the replenishment unit is not attached, the image forming apparatus prohibits the print process and outputs a notification that the replenishment unit is not attached to the unit attachment portion.

Furthermore, the image forming apparatus may include a tag reader. The tag reader reads information from an electronic tag attached to the replenishment unit by performing a short-distance wireless communication. For example, information of the developer, such as the color and type of the developer, is recorded in the electronic tag.

There is known an image forming apparatus that determines that a replenishment unit is not attached to the unit attachment portion when the tag reader cannot communicate with an electronic tag.

SUMMARY

An image forming apparatus according to an aspect of the present disclosure includes at least one unit attachment portion, at least one antenna for short-distance wireless communication, a tag reader, at least one recognition tag, a displacement mechanism, and a state determining portion. A replenishment unit storing developer can be attached to the unit attachment portion in a detachable manner. The antenna is provided in correspondence with the unit attachment portion. The tag reader is configured to, when the replenishment unit is attached to the unit attachment portion, read developer information concerning the developer from a unit tag by the short-distance wireless communication via the antenna, the unit tag being an electronic tag attached to the replenishment unit. The recognition tag is provided in correspondence with the unit attachment portion. The recognition tag is an electronic tag in which recognition information is recorded in advance. The displacement mechanism is configured to displace a displacement portion in response to an attachment or a detachment of the replenishment unit to or from the unit attachment portion, hold the displacement portion at a first position so as to make a communication access from the tag reader to the recognition tag possible in a case where the replenishment unit is not attached to the unit attachment portion, and hold the displacement portion at a second position so as to make the communication access from the tag reader to the recognition tag impossible in a case where the replenishment unit is attached to the unit attachment portion. The state determining portion is configured to determine a state from among a unit attachment state, a unit non-attachment state, and an exceptional state based on information obtained via the tag reader. The unit attachment state is a state where the developer information can be obtained from the unit tag. The unit non-attachment state is a state where the recognition information can be obtained from the recognition tag via the tag reader. The exceptional state is a state other than the unit attachment state and the unit non-attachment state.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes embodiments of the present disclosure with reference to the accompanying drawings. It should be noted that the following embodiments are an example of specific embodiments of the present disclosure and should not limit the technical scope of the present disclosure.

First Embodiment

An image forming apparatus 10 according to a first embodiment is configured to execute a print process for forming an image on a sheet. The sheet is a sheet-like image formation medium such as a sheet of paper or an envelope.

Figure 1:
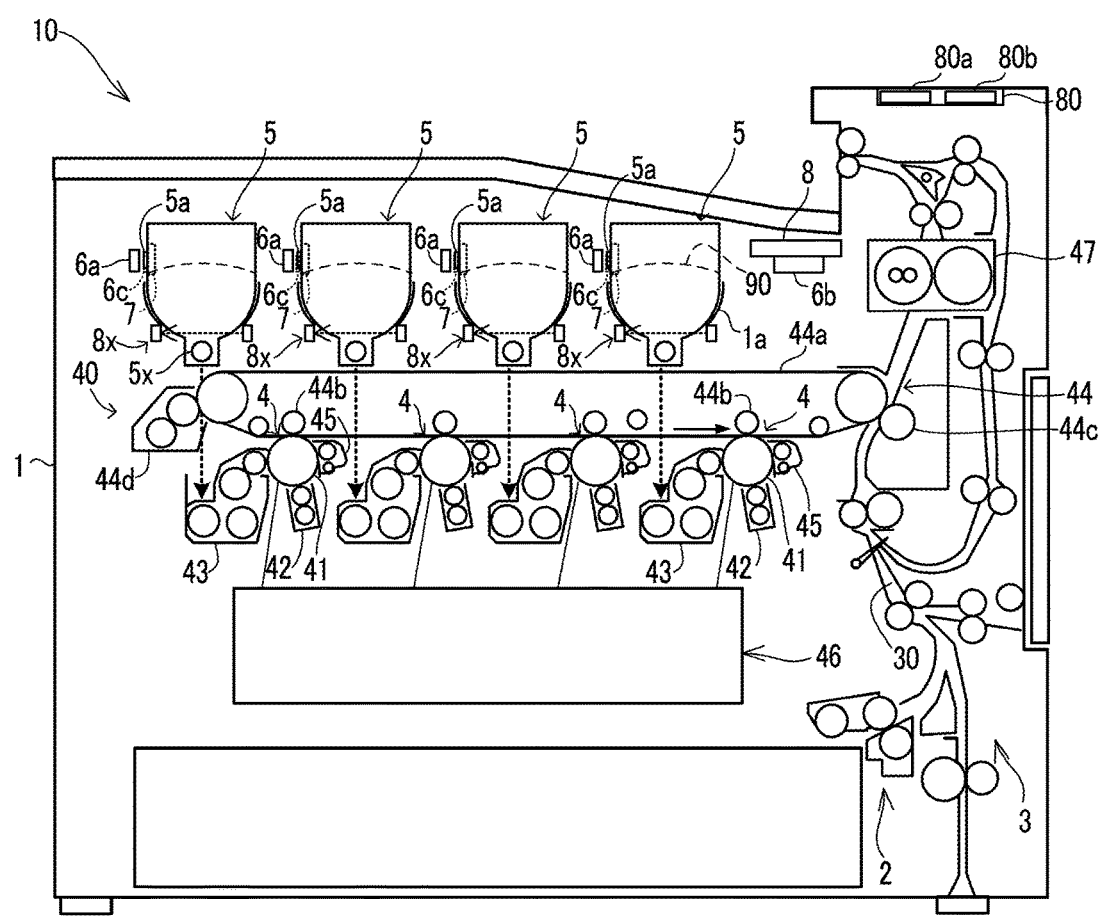
FIG. 1 is a configuration diagram of an image forming apparatus according to a first embodiment.

As shown in FIG. 1, the image forming apparatus 10 includes, in a main body 1, a sheet supply mechanism 2, a sheet conveying mechanism 3, an image forming portion 40, and a control portion 8. Furthermore, an operation/display portion 80 is attached to an outer surface of the main body 1.

The image forming portion 40 executes the print process by an electrophotographic system. In this case, the image forming portion 40 includes image creating portions 4, a laser scanning portion 46, a transfer device 44, and a fixing device 47. Each of the image creating portions 4 includes a photoconductor 41, a charging device 42, a developing device 43, and a photoconductor cleaning device 45.

The image forming apparatus 10 shown in FIG. 1 is a color image forming apparatus including the tandem image forming portion 40. As a result, the image forming apparatus 10 includes four image creating portions 4 that respectively correspond to colors cyan, magenta, yellow, and black.

Furthermore, the transfer device 44 includes an intermediate transfer belt 44a, four primary transfer devices 44b corresponding to the four image creating portions 4, a secondary transfer device 44c, and a belt cleaning device 44d.

The sheet supply mechanism 2 feeds the sheet to a conveyance path 30. The sheet conveying mechanism 3 conveys the sheet along the conveyance path 30.

The intermediate transfer belt 44a and the drum-like photoconductors 41 of the image creating portions 4 are rotationally driven by a drive mechanism (not shown). The charging device 42 uniformly charges a surface of the photoconductor 41. The laser scanning portion 46 writes an electrostatic latent image on the surface of the photoconductor 41.

The developing device 43 develops the electrostatic latent image on the surface of the photoconductor 41 by developer 90. This allows an image of the developer 90 to be formed on the surface of the photoconductor 41. It is noted that in the present embodiment, the developer 90 is toner.

The primary transfer devices 44b transfer the images of the developer 90 on the surfaces of the photoconductors 41 to the intermediate transfer belt 44a. This allows a color image to be formed on the intermediate transfer belt 44a from images of the four colors of the developer 90. The photoconductor cleaning device 45 removes residual developer 90 from the surfaces of the photoconductors 41.

The secondary transfer device 44c transfers the image of the developer 90 on the intermediate transfer belt 44a to the sheet conveyed along the conveyance path 30. The fixing device 47 fixes the image of the developer 90 transferred to the sheet, to the sheet by heating the image. The belt cleaning device 44d removes residual developer 90 from the intermediate transfer belt 44a.

Furthermore, the image forming apparatus 10 includes four replenishment units 5 that respectively store the developer 90 of different colors. The four replenishment units 5 can respectively be attached to four unit attachment portions 1a provided in the main body 1 in a detachable manner. The main body 1 constitutes a frame of the image forming apparatus 10, and the unit attachment portions 1a constitute a part of the main body 1.

The four replenishment units 5 replenish the developer 90 to the four developing devices 43 respectively. Each of the replenishment units 5 includes a replenishment screw 5x which is rotationally driven by a drive mechanism (not shown). As the replenishment screw 5x rotates, the developer 90 is supplied from the replenishment unit 5 to the developing device 43.

The image forming apparatus 10 includes remaining amount sensors 8x respectively provided in the unit attachment portions 1a. Each of the remaining amount sensors 8x is a sensor for detecting an empty state of a replenishment unit 5. The empty state is a state of the replenishment unit 5 where the remaining amount of the developer 90 in the replenishment unit 5 has fallen below a predetermined lower-limit amount.

For example, the remaining amount sensor 8x may be a transmission-type optical sensor configured to detect a level of the developer 90 through a transparent window of the replenishment unit 5. In addition, the remaining amount sensor 8x may be a sensor configured to detect whether or not the weight of the replenishment unit 5 has fallen below a predetermined lower-limit weight.

A unit tag 5a is attached to each of the replenishment units 5. The unit tag 5a is a passive-type electronic tag. For example, the unit tag 5a may be a passive-type RF (Radio Frequency) tag.

The image forming apparatus 10 further includes four antennas 6a and one tag reader/writer 6b, wherein the antennas 6a are for short-distance wireless communication and respectively provided on the four unit attachment portions 1a.

Figure 2:
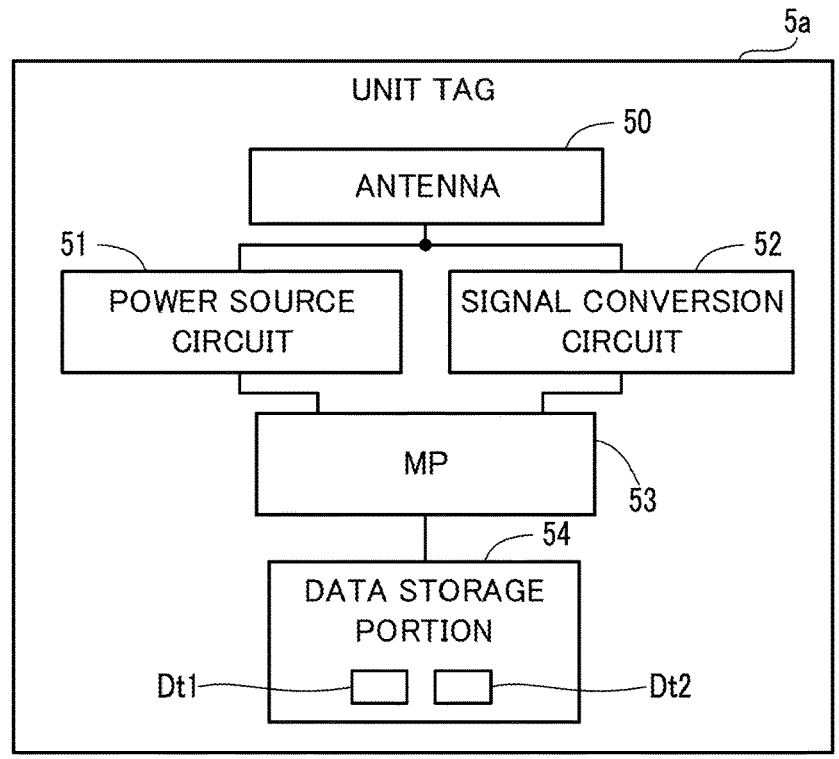
FIG. 2 is a block diagram of a unit tag attached to a replenishment unit.

As shown in FIG. 2, the unit tag 5a includes an antenna 50 for short-distance wireless communication, a power source circuit 51, a signal conversion circuit 52, a microprocessor 53, and a computer-readable, nonvolatile data storage portion 54.

The data storage portion 54 is, for example, a flash memory. Developer data Dt1 is stored in advance in the data storage portion 54 of the unit tag 5a, wherein the developer data Dt1 includes information of the developer 90 such as the color and type of the developer 90 stored in the replenishment unit 5. Furthermore, unit identification data Dt2 may be stored in advance in the data storage portion 54, wherein the unit identification data Dt2 is unique for each replenishment unit 5. The developer data Dt1 is an example of the developer information.

The power source circuit 51 rectifies a reception signal received by the antenna 50, and applies a DC voltage to the microprocessor 53. The signal conversion circuit 52 demodulates the reception signal received by the antenna 50, and transmits the demodulated reception signal to the microprocessor 53. Furthermore, the signal conversion circuit 52 modulates a transmission signal output from the microprocessor 53, and transmits the modulated transmission signal to the antenna 50. The transmission signal is output from the antenna 50 as transmission radio wave.

The microprocessor 53 performs a data communication with the tag reader/writer 6b via the antenna 50 and the signal conversion circuit 52. Specifically, upon receiving a read command from the tag reader/writer 6b, the microprocessor 53 transmits a specified piece of data stored in the data storage portion 54 to the tag reader/writer 6b. Furthermore, upon receiving a write command and data from the tag reader/writer 6b, the microprocessor 53 stores the received data in the data storage portion 54.

The tag reader/writer 6b is electrically connected with the four antennas 6a. The tag reader/writer 6b reads data from an electronic tag such as the unit tag 5a and writes data to the electronic tag by performing the short-distance wireless communication. The tag reader/writer 6b is an example of the tag reader.

For example, when a replenishment unit 5 has been attached to a unit attachment portion 1a, the tag reader/writer 6b can read the developer data Dt1 and the unit identification data Dt2 from the unit tag 5a attached to the replenishment unit 5.

Figure 3:
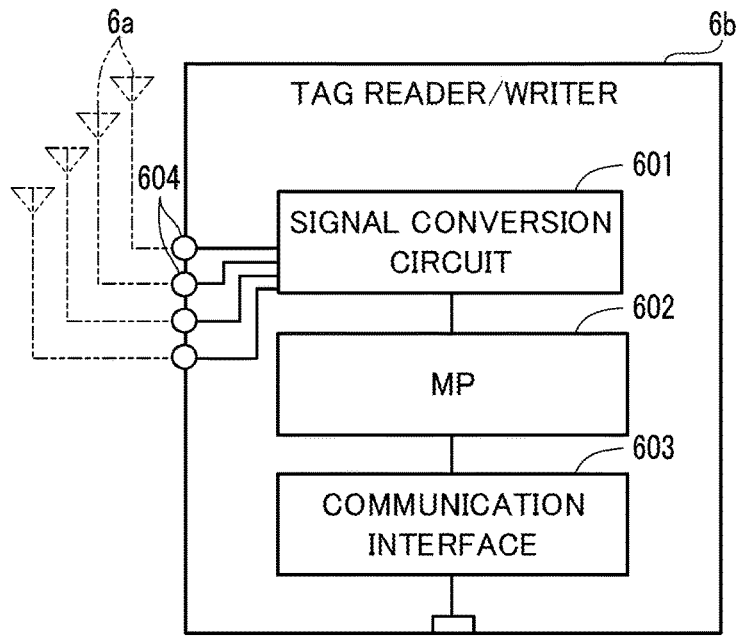
FIG. 3 is a block diagram of a tag reader/writer included in the image forming apparatus according to the first embodiment.

As shown in FIG. 3, the tag reader/writer 6b includes a signal conversion circuit 601, a microprocessor 602, and a communication interface 603.

The signal conversion circuit 601 modulates a transmission signal output from the microprocessor 602, and transmits the modulated transmission signal to the antenna 6a. The transmission signal is output from the antenna 6a as transmission radio wave. Furthermore, the signal conversion circuit 601 demodulates a reception signal received by the antenna 6a, and transmits the demodulated reception signal to the microprocessor 602.

The microprocessor 602 performs a data communication with an electronic tag such as the unit tag 5a via the antenna 6a and the signal conversion circuit 601. Specifically, to read data from the electronic tag, the microprocessor 602 transmits the read command to the electronic tag via the signal conversion circuit 601 and the antenna 6a. Furthermore, to write data to the electronic tag, the microprocessor 602 transmits the write command and data to the electronic tag via the signal conversion circuit 601 and the antenna 6a.

The communication interface 603 is a communication device configured to perform a data communication with the control portion 8. For example, the communication interface 603 transfers data that was read from an electronic tag by the microprocessor 602, to the control portion 8. Furthermore, the communication interface 603 receives data from the control portion 8, and transfers the received data to the microprocessor 602. This allows the microprocessor 602 to execute a writing process of writing data to the electronic tag.

In the example shown in FIG. 3, the tag reader/writer 6b is multi-antenna type including a plurality of antenna ports 604 in correspondence with the plurality of antennas 6a.

It is noted that the electronic tags such as the unit tags 5a may have an anti-collision function. In that case, the image forming apparatus 10 may include one antenna 6a formed over the four unit attachment portions 1a.

The tag reader/writer 6b is configured to execute the data reading process and the data writing process with respect to a plurality of electronic tags via one antenna 6a. The control portion 8 that controls the tag reader/writer 6b can identify a communication partner through identification data obtained from an electronic tag.

The operation/display portion 80 is a user interface device including an operation portion 80a and a display portion 80b. The operation portion 80a includes, for example, a touch panel and operation buttons for receiving user operations. The display portion 80b includes a display panel such as a liquid crystal display panel that can display information.

Figure 4:
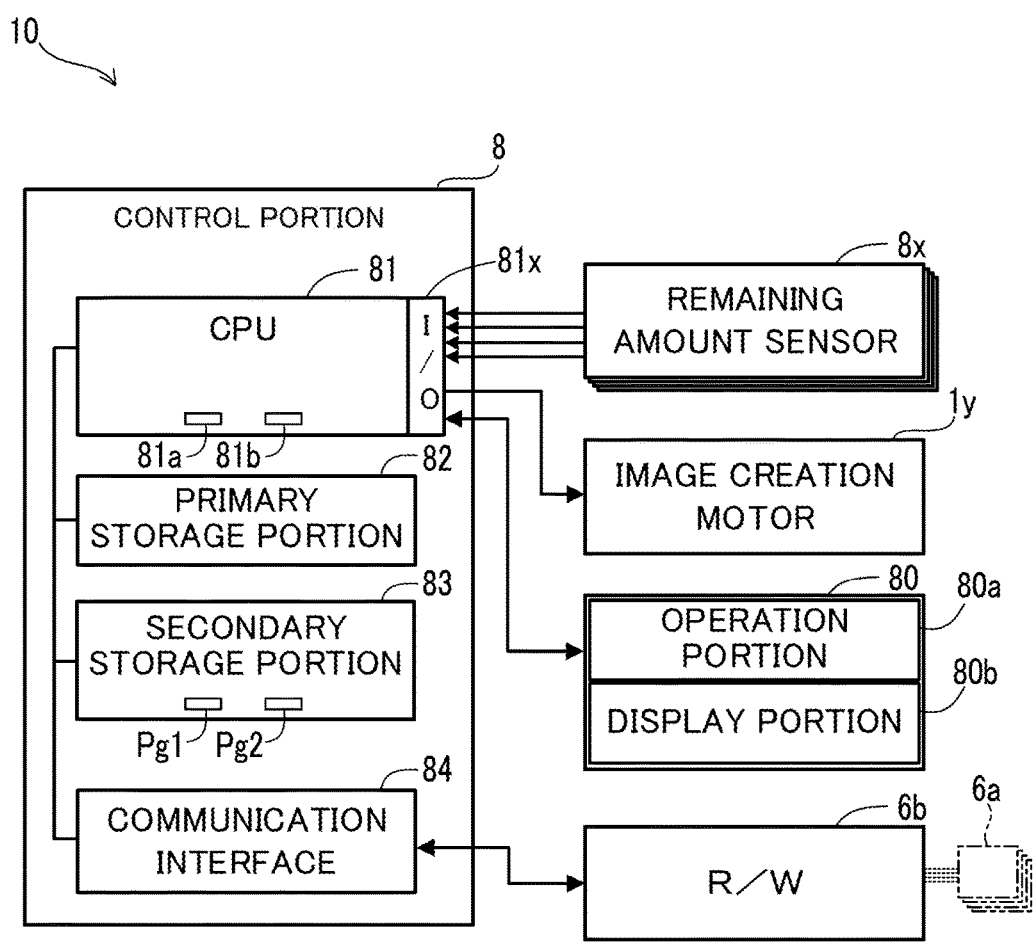
FIG. 4 is a block diagram of control-related portions in the image forming apparatus according to the first embodiment.

The control portion 8 controls the electric devices of the image forming apparatus 10. As shown in FIG. 4, the control portion 8 includes a CPU (Central Processing Unit) 81, a primary storage portion 82 such as a RAM (Random Access Memory), a secondary storage portion 83, and a communication interface 84.

The CPU 81 executes various data processes and controls the electric devices by executing programs stored in advance in the secondary storage portion 83. The CPU 81 includes a signal input/output port 81x.

The signal input/output port 81x includes a signal input port and a signal output port, wherein the signal input port inputs detection signals from various sensors such as the remaining amount sensors 8x, and the signal output port outputs control signals to the electric devices such as an image creation motor 1y.

The signal input port converts an analog signal into digital data, and stores the converted digital data in the CPU 81.

The signal output port converts digital data into an analog signal, and outputs the converted analog signal to an electric device.

For example, when a remaining amount sensor 8x detects the empty state, the CPU 81 prohibits the print process and displays a predetermined empty message on the display portion 80b.

The primary storage portion 82 primarily stores programs executed by the CPU 81 and data processed by the CPU 81. The secondary storage portion 83 is a computer-readable, nonvolatile storage device. For example, the secondary storage portion 83 may be a flash memory.

The communication interface 84 is a communication device configured to perform data communications with external devices such as the tag reader/writer 6b. For example, the communication interface 84 may serve as both a communicator for receiving print job data from an information processing apparatus, and a communicator for performing a communication with the tag reader/writer 6b.

The communication interface 84 transmits the read command output from the CPU 81 to the tag reader/writer 6b, and transfers data returned from the tag reader/writer 6b to the CPU 81. Furthermore, the communication interface 84 transmits the write command and data output from the CPU 81 to the tag reader/writer 6b.

The CPU 81 transmits the read command or the write command to the tag reader/writer 6b by specifying an antenna port 604 to be used.

It is noted that the control portion 8 may be realized by a processor such as a DSP (Digital Signal Processor) or a circuit such as an ASIC (Application Specific Integrated Circuit).

Meanwhile, the image forming apparatus 10 is preferably able to distinguish among the following three states: a unit attachment state where an official replenishment unit 5 is attached to a corresponding unit attachment portion 1a; a unit non-attachment state where no replenishment unit 5 is attached to a unit attachment portion 1a; and an exceptional state where an unofficial replenishment unit is attached to a unit attachment portion 1a. The unofficial replenishment unit is a replenishment unit to which an official unit tag 5a has not been attached.

The image forming apparatus 10 will be able to distinguish among the three states if it includes one or more unit detection sensors that are configured to detect whether or not the replenishment units 5 are attached to the unit attachment portions 1a. When the one or more unit detection sensors are to be provided in the image forming apparatus 10, the processor such as the CPU 81 that determines one among the three states needs to include as many signal input ports as the number of the unit detection sensors. For example, in the case of the image forming apparatus 10 that can execute a color printing, the processor needs to include four signal input ports so as to determine one among the three states.

However, it is preferable that the processor is provided with a less number of signal input ports from the viewpoints of reducing the labor required for the wiring and reducing the cost.

The image forming apparatus 10 includes recognition tags 6c and displacement mechanisms 7 (see FIG. 1 and FIG. 6) that are described below. This allows the CPU 81 to determine one among the three states without increasing the number of signal input ports to be included in the signal input/output port 81x.

[Recognition Tags 6c]

Recognition tags 6c are provided in correspondence with the unit attachment portions 1a. In the present embodiment, the image forming apparatus 10 includes four recognition tags 6c that respectively correspond to the four unit attachment portions 1a.

Figure 5:
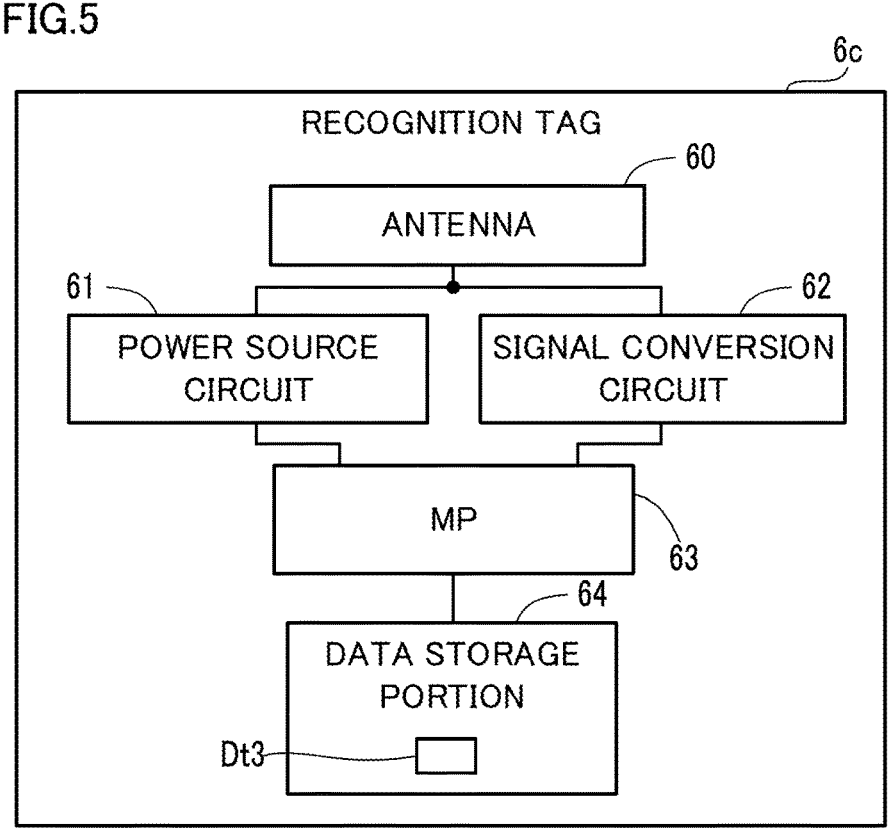
FIG. 5 is a block diagram of a recognition tag included in the image forming apparatus according to the first embodiment.

The recognition tags 6c are electronic tags in which recognition data Dt3 is recorded in advance (see FIG. 5). The recognition data Dt3 includes recognition information that makes the unit attachment portions 1a of the image forming apparatus 10 recognizable.

As shown in FIG. 5, each of the recognition tags 6c, as each of the unit tag 5a, includes an antenna 60, a power source circuit 61, a signal conversion circuit 62, a microprocessor 63, and a data storage portion 64. The configurations and functions of the antenna 60, the power source circuit 61, the signal conversion circuit 62, the microprocessor 63 and the data storage portion 64 are the same as the configurations and functions of the antenna 50, the power source circuit 51, the signal conversion circuit 52, the microprocessor 53 and the data storage portion 54.

[Displacement Mechanisms 7]

Figure 6:
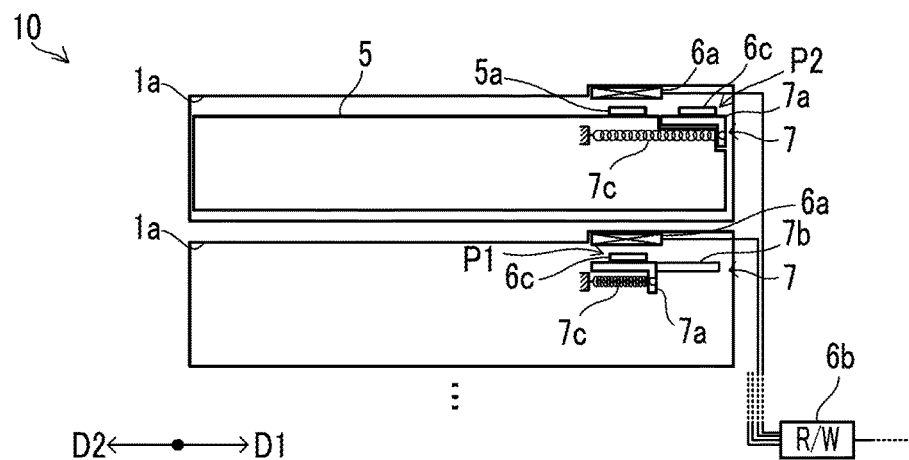
FIG. 6 is a configuration diagram of displacement mechanisms related to recognition tags and their periphery in the image forming apparatus according to the first embodiment.

As shown in FIG. 6, each of the displacement mechanisms 7 is configured to displace a displacement portion 7a in response to an attachment or a detachment of the replenishment unit 5 to or from the unit attachment portion 1a. The displacement portions 7a are provided separately from the main body 1. Each of the displacement portions 7a is supported by a part of the main body 1 or by a member fixed to the main body 1 so as to be displaced along an attachment direction D1. The displacement mechanisms 7 are respectively provided in the unit attachment portions 1a. That is, the image forming apparatus 10 includes four displacement mechanisms 7 corresponding to the four unit attachment portions 1a.

The attachment direction D1 is a direction in which a replenishment unit 5 slides toward a corresponding unit attachment portion 1a when the replenishment unit 5 is attached to the unit attachment portions 1a. In the following description, an opposite direction to the attachment direction D1 is referred to as a separating direction D2. For example, the attachment direction D1 may be from the front side to the rear side of the image forming apparatus 10.

In a state where a replenishment unit 5 is attached to a corresponding unit attachment portion 1a, the unit tag 5a of the replenishment unit 5 is within the communication range of the short-distance wireless communication, facing the antenna 6a.

In the example shown in FIG. 6, each of the displacement mechanisms 7 includes the displacement portion 7a, a guide portion 7b, and a spring 7c. The guide portion 7b guides the displacement portion 7a along the attachment direction D1. The guide portion 7b is a part of the main body 1 or a member fixed to the main body 1. For example, the guide portion 7b is a guide rail having a groove formed along the attachment direction D1. In this case, in a state where a part of the displacement portion 7a is inserted in the groove of the guide portion 7b, the guide portion 7b guides the displacement portion 7a along the attachment direction D1. The guide portion 7b may support the displacement portion 7a. The spring 7c applies an elastic force to the displacement portion 7a in the separating direction D2.

The guide portion 7b restricts the displacement direction of the displacement portions 7a, and restricts the displacement range of the displacement portion 7a at least in the separating direction D2 to a first position P1. In a state where the replenishment unit 5 is detached from the unit attachment portion 1a, the displacement portion 7a is held at the first position P1 by the elastic force of the spring 7c and by the guide portion 7b that restricts the displacement of the displacement portion 7a.

When the replenishment unit 5 is attached to the unit attachment portion 1a, a part of the replenishment unit 5 comes into contact with the displacement portion 7a. This allows the displacement portion 7a to be displaced in the attachment direction D1 against the elastic force of the spring 7c. In a state where the replenishment unit 5 is attached to the unit attachment portion 1a, the displacement portion 7a is held at a second position P2 by the replenishment unit 5 that restricts the elastic force of the spring 7c and the displacement of the displacement portion 7a.

That is, in a case where the replenishment unit 5 is not attached to the unit attachment portion 1a, the displacement mechanism 7 holds the displacement portion 7a at the first position P1. Furthermore, in a case where the replenishment unit 5 is attached to the unit attachment portion 1a, the displacement mechanism 7 holds the displacement portion 7a at the second position P2.

In the present embodiment, the recognition tags 6c are respectively fixed to the displacement portions 7a. That is, each recognition tag 6c is displaced together with a displacement portion 7a to which it is fixed.

As shown in FIG. 6, when the displacement portion 7a is at the first position P1, the recognition tag 6c is positioned to face the antenna 6a and be within the communication range of the short-distance wireless communication. That is, when the displacement portion 7a is at the first position P1, a communication access from the tag reader/writer 6b to the recognition tag 6c is possible.

On the other hand, when the displacement portion 7a is at the second position P2, the recognition tag 6c is positioned to be away from the antenna 6a and be out of the communication range of the short-distance wireless communication. That is, when the displacement portion 7a is at the second position P2, a communication access from the tag reader/writer 6b to the recognition tag 6c is impossible.

[State Determining Portion 81a]

The CPU 81 functions as a state determining portion 81a and a state notifying portion 81b by executing respectively a first program Pg1 and a second program Pg2 that are stored in advance in the secondary storage portion 83 (see FIG. 4).

The state determining portion 81a is configured to determine the state of the unit attachment portion 1a from among the unit attachment state, the unit non-attachment state, and the exceptional state based on information obtained via the tag reader/writer 6b. The state determining portion 81a determines the state from among the unit attachment state, the unit non-attachment state, and the exceptional state, for each of the four unit attachment portions 1a.

Specifically, the state determining portion 81a determines that the unit attachment portion 1a is in the unit attachment state when the developer data Dt1 can be obtained from the unit tag 5a via the tag reader/writer 6b. In addition, the state determining portion 81a determines that the unit attachment portion 1a is in the unit non-attachment state when the recognition data Dt3 can be obtained from the recognition tag 6c. It is noted that when neither the developer data Dt1 nor the recognition data Dt3 can be obtained, the unit attachment portion 1a is determined to be in the exceptional state.

As described above, the state determining portion 81a can distinguish among: the unit attachment state where an official replenishment unit 5 is attached; the unit non-attachment state where neither an official replenishment unit 5 nor a unofficial replenishment unit is attached; and the exceptional state where a unofficial replenishment unit is attached, without increasing the number of signal input ports required for the distinguishing.

The state notifying portion 81b distinguishes between the unit non-attachment state and the exceptional state and displays information regarding the determination result of the state determining portion 81a on the display portion 80b.

Figure 7:
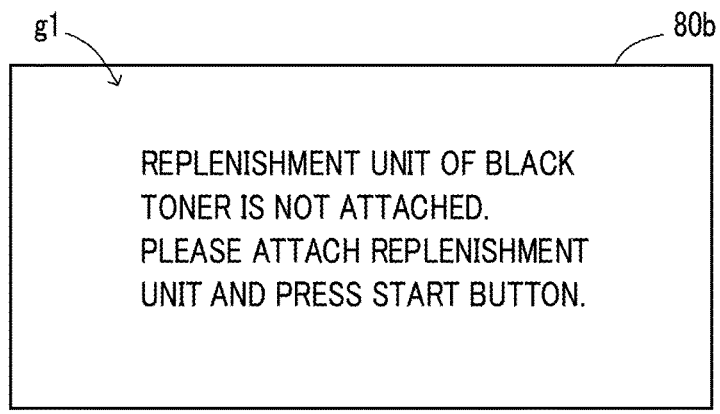
FIG. 7 shows an example of a first notification screen in the image forming apparatus according to the first embodiment.
Figure 8:
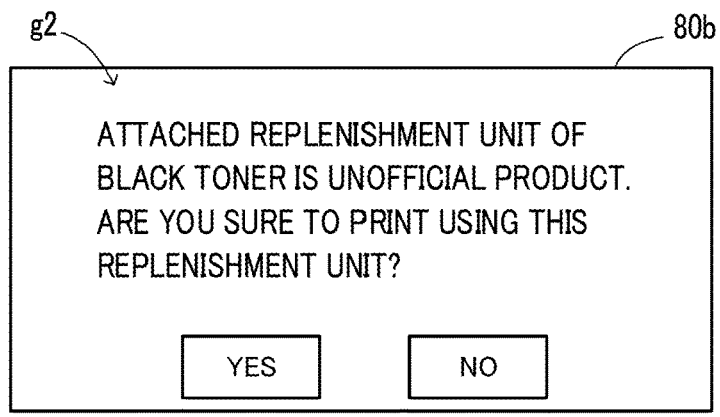
FIG. 8 shows an example of a second notification screen in the image forming apparatus according to the first embodiment.

For example, the state notifying portion 81b outputs a first notification g1 via the display portion 80b, wherein the first notification g1 urges to attach a replenishment unit 5 to a unit attachment portion 1a that has been determined to be in the unit non-attachment state (see FIG. 7). In addition, when the state determining portion 81a determines that the unit attachment portion 1a is in the exceptional state, the state notifying portion 81b outputs a second notification g2 via the display portion 80b, wherein the second notification g2 urges to confirm whether or not to permit the print process using the unofficial replenishment unit (see FIG. 8).

It is noted that when all of the unit attachment portions 1a are determined to be in the unit attachment state, the state notifying portion 81b may not output a notification in particular, or may output a notification indicating the normal state.

Second Embodiment

Figure 9:
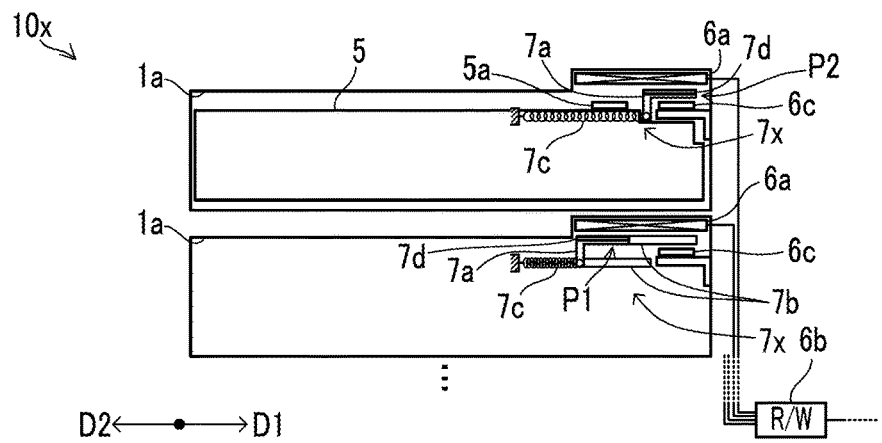
FIG. 9 is a configuration diagram of displacement mechanisms related to recognition tags and their periphery in an image forming apparatus according to a second embodiment.

Next, with reference to FIG. 9, a description is given of displacement mechanisms 7x related to the recognition tags 6c in an image forming apparatus 10x according to a second embodiment. It is noted that in FIG. 9, components that are the same as those shown in FIG. 6 are assigned the same reference signs.

Similar to the displacement mechanisms 7, each of the displacement mechanisms 7x includes the displacement portion 7a, the guide portion 7b, and the spring 7c. Each of the displacement mechanisms 7x, too, is configured to displace a displacement portion 7a in response to an attachment or a detachment of the replenishment unit 5 to or from the unit attachment portion 1a. The following describes differences of the displacement mechanisms 7x from the displacement mechanisms 7.

In the displacement mechanisms 7x, each displacement portion 7a includes a blocking member 7d configured to block the radio waves of the short-distance wireless communication. For example, the blocking member 7d may be a metal plate.

In the present embodiment, each recognition tag 6c is supported by a part of a unit attachment portion 1a so as to be at a predetermined position that faces the antenna 6a and is within the communication range of the short-distance wireless communication.

In addition, in a state where a replenishment unit 5 is attached to a unit attachment portion 1a, the unit tag 5a is located at a position that faces the antenna 6a and is within the communication range of the short-distance wireless communication.

In the present embodiment, the first position P1 of the displacement portion 7a is away from between the antenna 6a and the recognition tag 6c, and the second position P2 is located between the antenna 6a and the recognition tag 6c. When the displacement portion 7a is at the second position P2, the blocking member 7d blocks the radio wave that is emitted from the antenna 6a toward the recognition tag 6c.

That is, the first position P1 of the present embodiment is an example of the position of the displacement portion 7a when a communication access from the tag reader/writer 6b to the recognition tag 6c is possible. Similarly, the second position P2 of the present embodiment is an example of the position of the displacement portion 7b when a communication access from the tag reader/writer 6b to the recognition tag 6c is impossible.

In the present embodiment, too, similar to a case where the image forming apparatus 10 is adopted, the state determining portion 81a can distinguish and determine the state of each unit attachment portion 1a from among the unit attachment state, the unit non-attachment state, and the exceptional state.

When the image forming apparatus 10x is adopted, the same effect is produced as when the image forming apparatus 10 is adopted.

Application Examples

In the image forming apparatus 10, 10x, each of the displacement mechanisms 7, 7x may be a link mechanism that is engaged with a part of the replenishment unit 5 that is attached to and detached from the unit attachment portion 1a so as to cause the displacement portion 7a to be displaced in the attachment direction D1 and the separating direction D2.

In addition, the recognition tag 6c and the displacement mechanism 7, 7x may be applied to a monochrome image forming apparatus that includes only one unit attachment portion 1a.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
at least one unit attachment portion to which a replenishment unit storing developer can be attached in a detachable manner;
at least one antenna for short-distance wireless communication provided in correspondence with the unit attachment portion;
a tag reader configured to, when the replenishment unit is attached to the unit attachment portion, read developer information concerning the developer from a unit tag by the short-distance wireless communication via the antenna, the unit tag being an electronic tag attached to the replenishment unit;
at least one recognition tag provided separately from the antenna and the tag reader, in correspondence with the unit attachment portion, the recognition tag being an electronic tag in which recognition information is recorded in advance;
a displacement mechanism provided in the unit attachment portion, including a displacement portion that is displaced by coming in contact with the replenishment unit when the replenishment unit is attached to the unit attachment portion, and configured to displace the displacement portion in response to an attachment or a detachment of the replenishment unit to or from the unit attachment portion, hold the displacement portion at a first position so as to make a communication access from the tag reader to the recognition tag possible in a case where the replenishment unit is not attached to the unit attachment portion, and hold the displacement portion at a second position so as to make the communication access from the tag reader to the recognition tag impossible in a case where the replenishment unit is attached to the unit attachment portion; and a state determining portion configured to determine a state from among a unit attachment state, a unit non-attachment state, and an exceptional state based on information obtained via the tag reader, wherein the unit attachment state is a state where the developer information can be obtained from the unit tag, the unit non-attachment state is a state where the recognition information can be obtained from the recognition tag via the tag reader, and the exceptional state is a state other than the unit attachment state and the unit non-attachment state, where neither the developer information nor the recognition information can be obtained.

2. The image forming apparatus according to claim 1, wherein
the recognition tag is fixed to the displacement portion,
when the displacement portion is at the first position, the recognition tag is positioned to face the antenna and be within a communication range of a short-distance wireless communication, and
when the displacement portion is at the second position, the recognition tag is positioned to be away from the antenna and be out of the communication range of the short-distance wireless communication.

3. The image forming apparatus according to claim 1, wherein
the recognition tag is supported to be at a position that is within the communication range of the short-distance wireless communication and faces the antenna,
the displacement portion includes a blocking member configured to block radio waves of the short-distance wireless communication,
the first position is away from between the antenna and the recognition tag, and
the second position is located between the antenna and the recognition tag.

4. The image forming apparatus according to claim 1, further comprising:
a display portion configured to display information; and
a state notifying portion configured to distinguish between the unit non-attachment state and the exceptional state and displays information regarding a determination result of the state determining portion on the display portion.

5. The image forming apparatus according to claim 1, comprising:
a plurality of the unit attachment portions and a plurality of the recognition tags corresponding to the plurality of the unit attachment portions, wherein
the state determining portion determines the state from among the unit attachment state, the unit non-attachment state, and the exceptional state, for each of the plurality of the unit attachment portions.

* * * * *